United States Patent
Bates

[11] 3,865,396
[45] Feb. 11, 1975

[54] VEHICLE SUSPENSIONS
[75] Inventor: Gregory John Bates, Whetstone, England
[73] Assignee: Dunlop Limited, London, England
[22] Filed: Sept. 17, 1973
[21] Appl. No.: 397,726

[30] Foreign Application Priority Data
Sept. 20, 1972  Great Britain .................... 43527/72
May 17, 1973  Great Britain .................... 23483/73

[52] U.S. Cl. .......................... 280/124 R, 267/21 R
[51] Int. Cl. ............................................. B60g 11/62
[58] Field of Search ..... 280/124 R, 124 F, 104.5 A; 267/21 R, 21 A

[56] References Cited
UNITED STATES PATENTS
| | | | |
|---|---|---|---|
| 2,998,264 | 8/1961 | Stump | 280/124 F |
| 3,007,715 | 11/1961 | Maharick | 280/124 F |
| 3,400,946 | 9/1968 | Bacher | 280/124 R |
| 3,726,540 | 4/1973 | Grooss | 280/104.5 A |
| 3,747,948 | 7/1973 | Granning | 280/124 R |

Primary Examiner—Philip Goodman
Assistant Examiner—John A. Carroll
Attorney, Agent, or Firm—Stevens, Davis, Miller & Mosher

[57] ABSTRACT

A vehicle suspension comprising a rigid level and first and second springs for connecting it to a vehicle. The second spring is of a lower rate than the first spring and has a deflection limit after which it becomes solid so that the lever then pivots about the second spring. The lever is attached to the vehicle axle and the resultant suspension has an increased rate in the laden condition of the vehicle, of which the following is a Specification.

12 Claims, 8 Drawing Figures

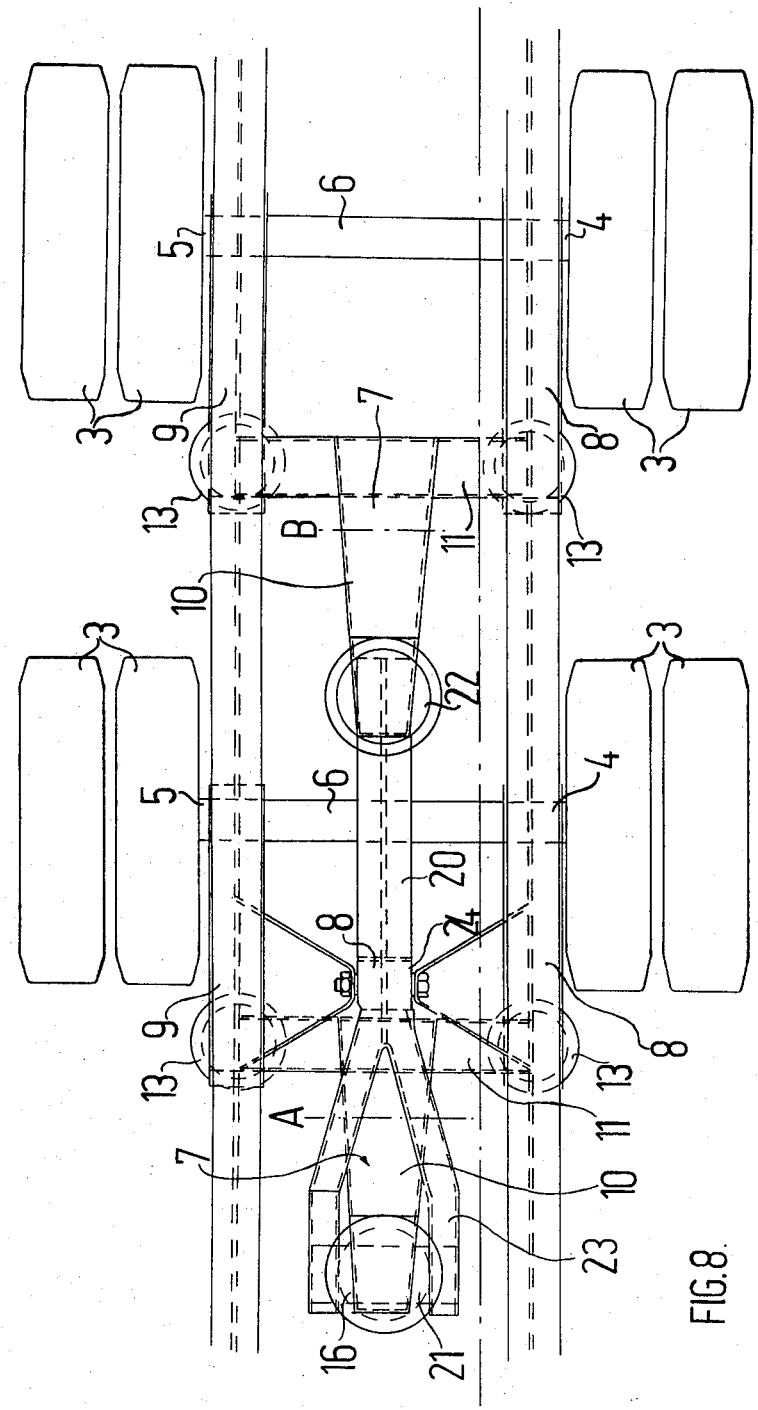

VEHICLE SUSPENSIONS

This invention relates to vehicle suspensions and particularly to suspensions for commercial vehicles which utilise bonded rubber-to-metal springs.

Hitherto the use of plain rubber-to-metal springs on commercial vehicles has resulted in high stiffness and thus a hard ride in the tare or unladen condition because of the need to provide suitable ride characteristics in the fully-laden condition. This problem has been overcome to some extent by using air suspension systems but the associated air supply and control means incur penalties of cost, complexity, increased likelihood of failure and weight.

According to one aspect of the present invention a vehicle suspension for mounting a vehicle body upon a wheel carried in a bearing housing comprises a rigid lever, a main spring and a secondary spring of lower rate than the main spring and having a fixed deflection limit after which the spring becomes effectively solid wherein the main spring, the bearing housing and the secondary spring are attached to the lever at spaced-apart intervals along its length so that wheel suspension movement results primarily in secondary spring deflection until the fixed deflection limit is reached whereupon further wheel suspension movement pivots the lever about the secondary spring and the main spring provides the suspension and vehicle support.

The main spring and secondary spring may be at opposite sides of the bearing housing but are preferably at the same side so that the suspension is either a trailing or a leading cantilever suspension.

According to another aspect of the present invention a vehicle suspension for mounting a vehicle body on an axle-set comprising an axle and a wheel rotatably mounted at either end of the axle compreses a lever provided by a Y-shaped frame for location substantially horizontally beneath the vehicle body, the frame being attachable by two limbs to the axle and the other limb extending substantially longitudinally of the vehicle, a pair of main-springs mounted on the limbs and spaced-apart transversely of the frame for acting substantially vertically between the vehicle body and a point on the frame intermediate its ends, a secondary spring, of lower rate than the main springs having a fixed deflection limit after which the spring becomes effectively solid, said secondary spring being for attachment to the other limb of the frame and to the vehicle body so that when mounted on a vehicle wheel suspension movement results primarily in secondary spring deflection and pivoting of the frame about a substantially horizontal transverse axis between the main springs and the secondary spring until the fixed deflection limit is reached whereupon further wheel suspension movement pivots the frame about a substantially horizontal transverse axis through the secondary spring and the main springs then provide the suspension for the vehicle.

According to another aspect of the present invention a vehicle suspension for supporting a vehicle body upon a pair of axle-sets arranged in tandem each axle-set comprising an axle and wheel rotatably mounted at either end of the axle comprises for each axle set a lever provided by a Y-shaped frame for location substantially horizontally beneath the vehicle body, the frame being attachable by two limbs to the axle and the other limb extending substantially longitudinally of the vehicle, a pair of main springs mounted on the limbs and spaced-apart transversely of the frame for acting substantially vertically between the vehicle body and a point on the frame intermediate its ends, a secondary spring, of lower rate than the main springs having a fixed deflection after which the spring becomes effectively solid, said secondary spring being attached to said other limb of the frame and adapted for attachment to the vehicle by means of a balance device between the secondary springs of each axle-set wherein when mounted on an unladen vehicle wheel movement causes pivoting of each frame about a substantially transverse axis between the main springs and the secondary springs of that axle and as the vehicle is laden an imaginary pivotal axis moves towards the secondary spring until when fully laden the frames each pivot about the solid secondary springs, the balance device between the secondary springs acting to equalise the load supported by each axle-set.

The balance device is preferably a balance beam pivotally connected at its centre to the vehicle body and connected to the secondary springs, one at either end.

The main springs may comprise elastomeric material springs and are preferably frusto-conical rubber springs, the rubber being located between metal members. The metal members may be bonded to the rubber spring material.

The secondary spring is preferably an air spring which is pressurised on fitting the suspension to a vehicle to allow a predetermined deflection of the spring before it becomes solid.

The spring can conveniently include an internal stop which is reached at the predetermined deflection and which then becomes the pivotal point for the frame. Furthermore the stop may be made slightly resilient.

Another aspect of the invention provides a vehicle comprising a vehicle body and an axle-set mounted by means of a suspension as described in the preceding paragraphs.

Such a vehicle may be provided with additional suspension damping means by conventional dampers acting between the frame and the vehicle body or damping may be incorporated in the body of the aforesaid elastomeric spring.

Some embodiments of the invention will now be described, by way of example, only, in conjunction with the attached diagrammatic drawings in which:

FIG. 8 is a plan view of the suspension of FIG. 7.

Figure 1:
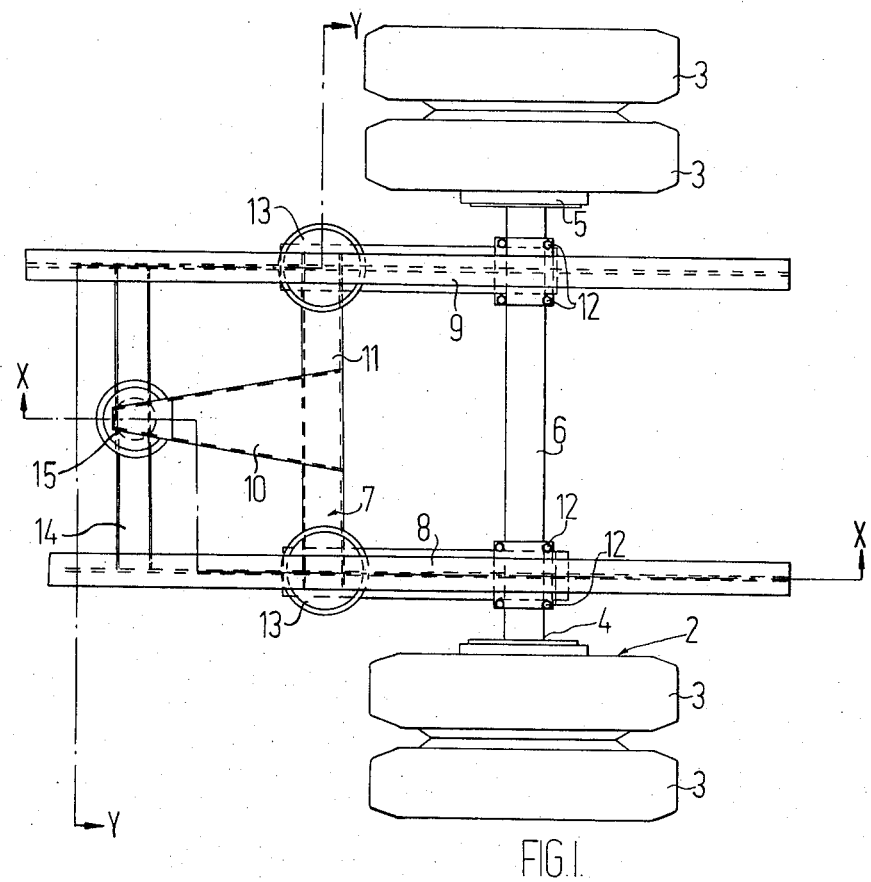
FIG. 1 is a plan view of a suspension according to the present invention applied to a single axle of a vehicle semi-trailer.
Figure 2:
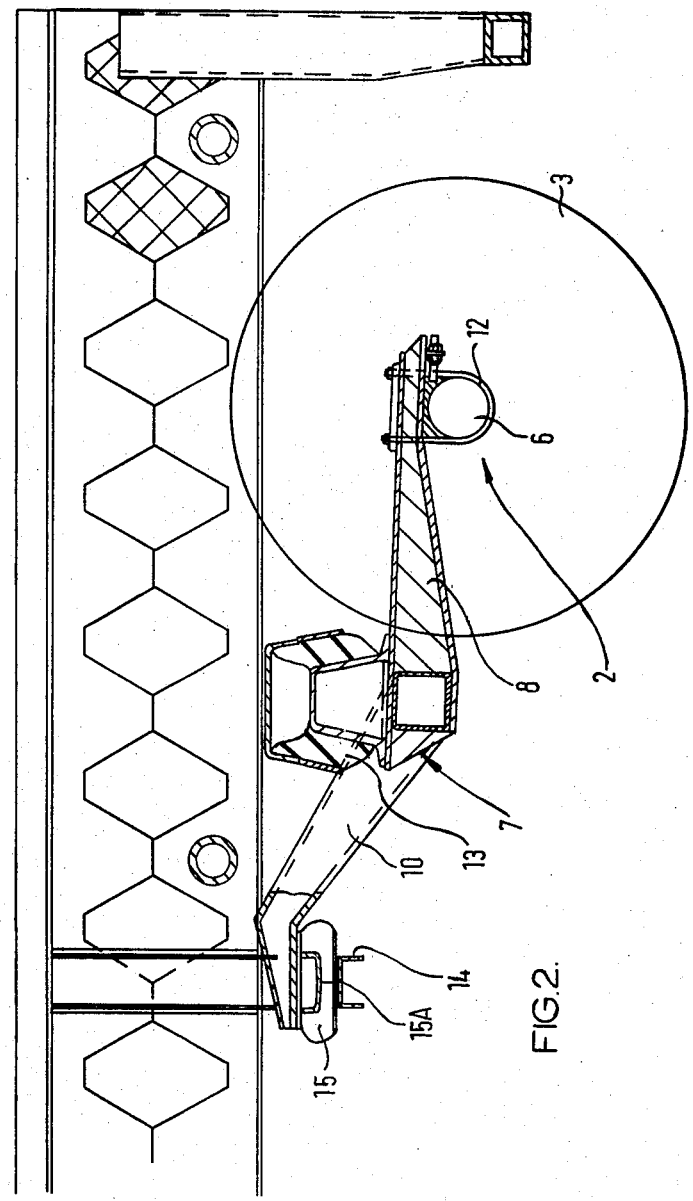
FIG. 2 is a side view on the line X—X of FIG. 1.
Figure 3:
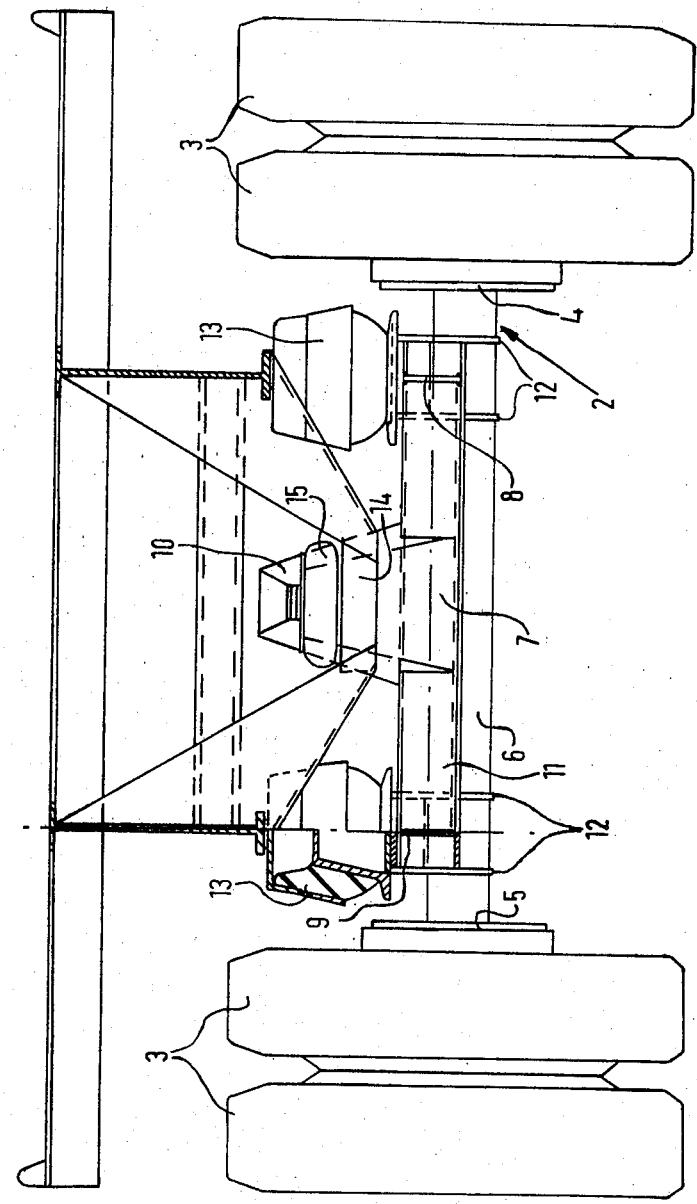
FIG. 3 is an end view on the line Y—Y of FIG. 1.

As shown in FIGS. 1–3 the body 1 of a single axle semi-trailer has provided an axle-set 2 comprising dual wheels 3 rotatably mounted in wheel bearings at both ends 4,5 of a rigid axle 6.

A generally Y-shaped frame 7 is formed by two I-section beams 8,9 and a rectangular section beam 10 interconnected by a square section cross-member 11 such that the three beams 8, 9 and 10 are mutually parallel.

The frame 7 is mounted beneath the vehicle body so that the beams 8, 9 and 10 extend generally longitudinally and the beams 8 and 9 are connected one to either end of the axle 6 by means of U-bolts 12.

A pair of main spring units 13 each in the form of a frusto-conical rubber spring bonded between metal end plates is mounted between the frame 7 and the vehicle body one being attached to either end of the cross-member 11 and both acting vertically to support the vehicle.

The forward end 10 of the frame 7 is attached to the vehicle body by means of an air bellows secondary spring 15 which is attached to a transverse mounting beam 14 which is welded to the vehicle body 1 so that it extends across the vehicle a short distance underneath the forward end 10 of the frame 7. The secondary spring 15 has an internal mechanical stop 15a (FIG. 2) which allows the spring to be compressed only by about 2.5 cms.

Figure 4:
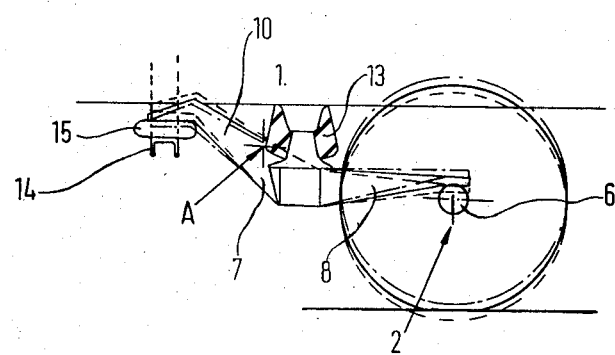
FIGS. 4 and 5 show the suspension in the tare and fully laden conditions respectively.

When the vehicle is at its tare unladen condition as shown in FIG. 4 the secondary spring 15 is pressurised to provide 2.5 cm clearance at the mechanical stop 15a. The spring is then sealed. Axle movement in the tare condition of the vehicle is accommodated by means of the frame 7 pivoting about an imaginary horizontal axis A between the main spring units 13 and the secondary spring 15. The secondary spring 15 is chosen to have a low rate compared with the main spring units 13 and thus the axis A is near the main spring units 13 as shown. Axle movement is primarily controlled by vertical deflection of the secondary spring 15 and to a smaller extent by the resistance to conical deformation and some small vertical deflection of the main spring units 13. The resultant spring rate is low and is arranged to give good rise qualities in the tare condition.

Figure 5:
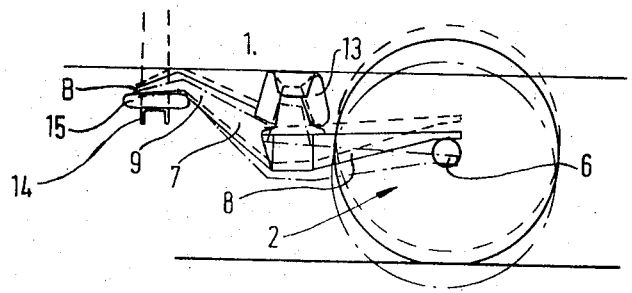

As the vehicle load is increased the suspension deflects until, at approximately twice tare load, contact occurs at the mechanical limit stops 15a in the secondary spring 15. As further deflection of the secondary spring 15 is then prevented the frame then pivots about an axle B through the secondary spring 15 (see FIG. 5).

The conical main spring units then provide the springing of the vehicle at the required higher rate conditions for ride in the laden condition of the vehicle.

Figure 6:
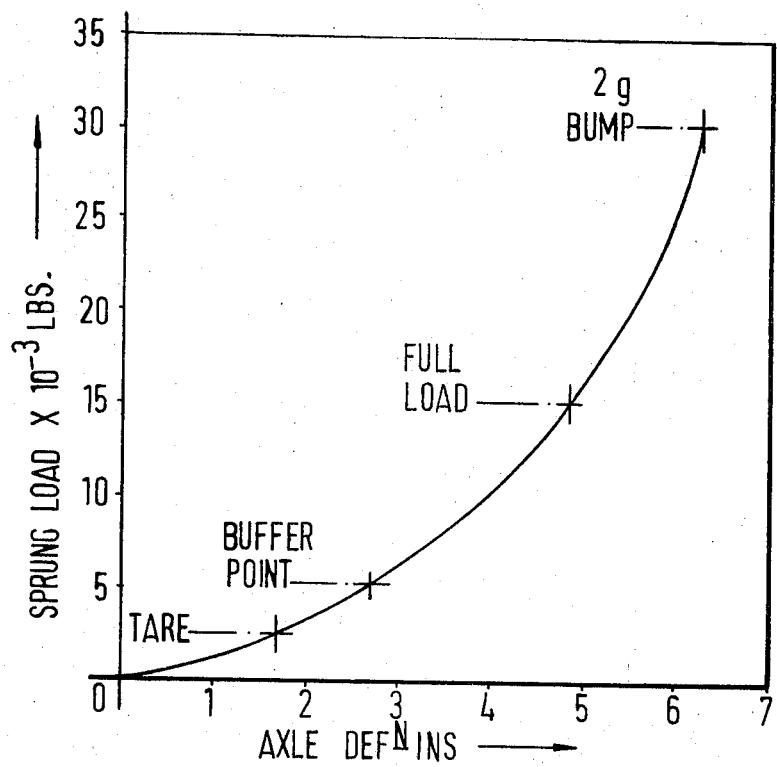
FIG. 6 shows the suspension characteristics.

As the secondary spring 15 is a sealed air-filled spring its vertical stiffness rate increases with deflection and this results in a substantially smooth transfer from one pivotal axis to the other. The resultant suspension characteristic is shown in FIG. 6.

The arrangement provides the required axle location for braking, cornering and manoeuvring loads by means of the main conical springs 13 and the resulting axle compliance provides isolation against lateral and longitudinal high frequency vibrations.

Furthermore the attachment of the main springs 13 to the ends of the transverse cross-member 11 produces an equivalent spring centre approximately at the vehicle track which results in a high roll stiffness whilst maintaining equal wheel stiffness rates for one and two wheel bumps.

Figure 7:
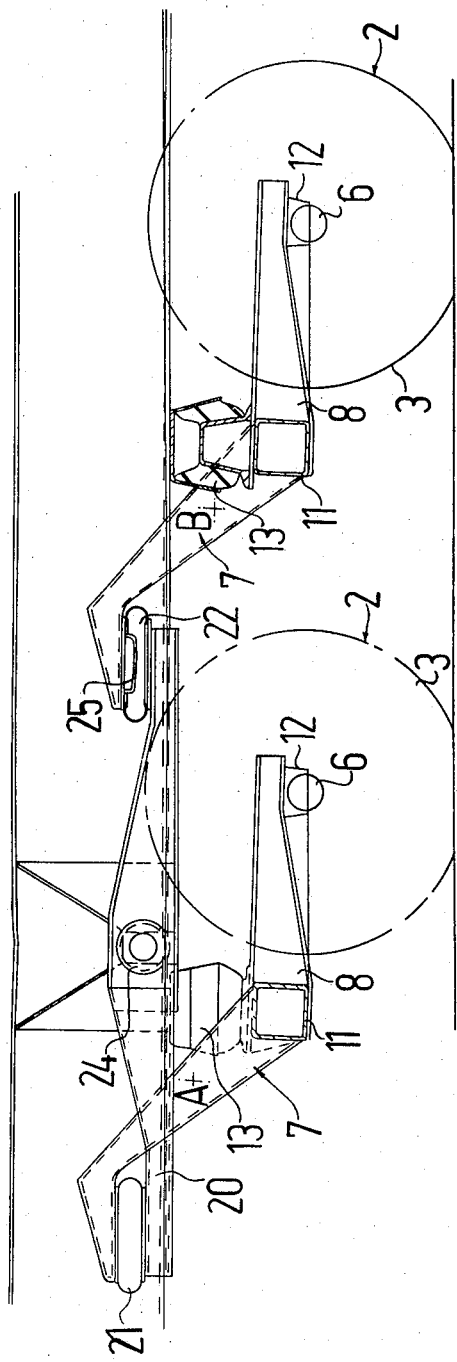
FIG. 7 is a side view of a tandem axle suspension according to the present invention with the rear air spring and conical spring part-sectioned.

The tandem axle suspension shown in FIGS. 7 and 8 comprises two similar Y frames 7 mounted to the vehicle body by main spring units 13. Each frame arrangement is the same as that described above except that the forward end 10 of each frame 7 is attached to a balance device in the form of a balance beam 20 by means of an air-bellows secondary spring 21,22. The air-bellows 21 and the leading axle is connected to the end of the balance beam by means of a short transverse beam extending between a forked end 23 provided on the balance beam 20. The other end of the balance beam acts directly to support the secondary spring 22 and the other axle-set. The balance beam 20 is attached by a pivotal connection 24 at a point intermediate its length to the vehicle body 1. The pivotal connection is by means of a rubber bush bonded around a central pivot pin.

Both secondary springs 21 and 22 have an internal mechanical stop 25 which allows the spring to be compressed only by a predetermined amount before the stop is reached. The amount is typically 2.5 cms.

In operation the vehicle in its tare or unladen condition is set up with the secondary springs compressed to provide equal clearance at the mechanical stops 25 of about 2.5 cms.

In operation the vehicle in its tare or unladen condition is set up with the secondary springs compressed to provide equal clearance at the mechanical stops 25 of about 2.5 cms. The springs are then sealed. Axle movement in the tare condition of the vehicle is accommodated by the frames 7 pivoting about imaginary horizontal axes A, B between the main spring units 13 and the secondary springs 21,22. The secondary springs 21,22 are chosen to have a low rate compared with the main spring units 13 and thus the axes A,B are near the main spring units as shown. Axle movement is primarily controlled by vertical deflection of the secondary springs 21,22 and to a smaller extent by the resistance to conical deformation and some small vertical deflection of the main spring units 13. Equalisation of the loads supported by each axle-set is obtained by pivotal movement of the balance beam 20 under the influence of the force applied by the secondary springs at its ends. The resulting spring rate is low and is arranged to give good ride qualities in the tare condition.

As the vehicle load is increased the effective imaginary axes of rotation move progressively towards the secondary springs due to the inter-reacting rising stiffness rates of the primary springs and secondary springs. When the 2.5 cms clearance has been taken up in each of the secondary springs the secondary springs are snubbed-out and the conical main springs 13 then provide the suspension of the vehicle and the required high-rate conditions for ride in the laden condition of the vehicle.

Alternative arrangements of balance device may be used dependent on the particular installation. Furthermore the lever suspension may be of the trailing type as disclosed or may be of the leading type or a combination of both.

Furthermore if required additional damping may be provided either between the lever frame 7 and the vehicle body directly or between the lever frame 7 and the balance device 20 and/or the balance device 20 and the vehicle body 1 dependent on the required rate of load transfer and suspension damping. Such additional damping may be carried out by any of the normal means such as for example hydraulic dampers.

Furthermore the mechanical stops 25 may be provided with a resilient cushion so that the stop is less positive than in the case of a mechanical abutment. This can be done where it is necessary to further smooth the transfer of the pivotal axes. It will be appreciated that the free secondary spring deflection before the stop means is met is determined by the particular application.

Having now described my invention, what I claim is:

1. A vehicle suspension for mounting a vehicle body upon a wheel carried in a bearing housing comprising a rigid lever, a main spring and a secondary spring of lower rate than the main spring and having a fixed deflection limit after which the secondary spring becomes effectively solid wherein the main spring, the bearing housing and the secondary spring are attached to the lever at spaced-apart intervals along its length so that wheel suspension movement results primarily in secondary spring deflection until the fixed deflection limit is reached whereupon further wheel suspension movements pivots the lever about the secondary spring and the main spring provides the suspension and vehicle support.

2. A vehicle suspension according to claim 1 wherein the main spring and secondary spring are attached to the lever at the same side of the bearing housing.

3. A vehicle suspension according to claim 2 wherein the suspension is arranged to be a trailing cantilever suspension with the bearing housing attached at the rearward end of the lever in the sense of vehicle forward motion when attached to a vehicle.

4. A vehicle suspension for mounting a vehicle body on an axle-set comprising an axle and a wheel rotatably mounted at either end of the axle comprising a lever provided by a Y-shaped frame for location substantially horizontally beneath the vehicle body, the frame being attachable by two limbs to the axle and the other end extending substantially longitudinally of the vehicle, a pair of main springs mounted on the limbs and spaced-apart transversely of the frame for acting substantially vertically between the vehicle body and a point on the frame intermediate its ends, a secondary spring, of lower rate than the main spring having a fixed deflection limit after which the spring becomes effectively solid, said secondary spring being for attachment to the other limb of the frame and to the vehicle body so that wheel suspension movement results primarily in secondary spring deflection and pivoting of the frams about a substantially horizontal transverse axis between the main springs and the secondary spring until the fixed deflection limit is reached whereupon further wheel suspension movement pivots the frame about a substantially horizontal transverse axis through the secondary spring and the main springs then provide the suspension for the vehicle.

5. A vehicle suspension for supporting a vehicle body upon a pair of axle-sets arranged in tandem each axle-set comprising an axle and wheel rotatably mounted at either end of the axle comprising for each axle-set a lever provided by a Y-shaped frame for location substantially horizontally beneath the vehicle body, the frame being attachable by two limbs to the axle and the other limb extending substantially longitudinally of the vehicle, a pair of main springs mounted on the limbs and spaced-apart transversely of the frame for acting substantially vertically between the vehicle body and a point on the frame intermediate its ends, a secondary spring, of lower rate than the main springs having a fixed deflection after which the spring becomes effectively solid, said secondary spring being attached to said other limb of the frame and adapted for attachment to the vehicle by means of a balance device between the secondary springs of each axle-set wherein when mounted on an unladen vehicle wheel movement causes pivoting of each frame about a substantially transverse axis between the main springs and the secondary springs of that axle and as the vehicle is laden an imaginary pivotal axis moves towards the secondary spring until when approaching the fully laden the frames each pivot about the solid secondary springs, the balance device between the secondary springs acting to equalise the load supported by each axle-set.

6. A vehicle suspension according to claim 5 wherein the balance device comprises a balance beam for pivotal connection at its centre to the vehicle body and connected to the secondary springs, one at either end.

7. A vehicle suspension according to claim 1 wherein the main spring comprises a frusto-conical elastomeric material spring wherein the elastomeric material is located between metal members.

8. A vehicle suspension according to claim 1 wherein the main spring comprises a frusto-conical elastomeric material spring wherein the elastomeric material is bonded between metal members.

9. Aa vehicle suspension according to claim 1 wherein the secondary spring comprises an air spring.

10. A vehicle suspension according to claim 9 wherein the air spring has an internal stop member to provide the fixed deflection limit.

11. A vehicle suspension according to claim 1 wherein the fixed deflection limit is provided by a stop member having a resilient cushion so that the transfer to lever movement about said stop member is made gradual.

12. A vehicle suspension according to claim 1 wherein additional damping means are provided between the vehicle body and the lever.

* * * * *